United States Patent
Mellini et al.

[11] Patent Number: 5,979,197
[45] Date of Patent: Nov. 9, 1999

[54] VEHICLE ANTI-THEFT DEVICE FOR BLOCKING AT LEAST A PEDAL ARM

[76] Inventors: Alfredo Mellini, 1 Allée de la Marne, 93160 Noisy le Grand; Joseph Mellini, 15, avenue Saint Pierre, 94420 Le Plessis Trevise; Joseph Aliano, 4/6 Impasse Potier, 93380 Pierrefite, all of France

[21] Appl. No.: 08/732,247

[22] Filed: Oct. 25, 1996

[30] Foreign Application Priority Data

Oct. 24, 1995 [FR] France ..................... PCT/FR95/01402
Feb. 7, 1996 [FR] France .................................. 96 01486

[51] Int. Cl.$^6$ .................................................. B60R 25/08
[52] U.S. Cl. ................................. 70/199; 70/202; 70/238
[58] Field of Search ............................. 70/237, 238, 254, 70/198–203

[56] References Cited

U.S. PATENT DOCUMENTS

| | | |
|---|---|---|
| 2,330,536 | 9/1943 | Zimmermann . |
| 4,699,238 | 10/1987 | Tamir ..................................... 70/238 X |
| 5,282,373 | 2/1994 | Riccitelli ............................... 70/202 X |
| 5,537,846 | 7/1996 | Simon .................................... 70/237 X |
| 5,713,539 | 2/1998 | Russ et al. ............................. 70/238 X |
| 5,715,710 | 2/1998 | De Lucia et al. ..................... 70/237 X |
| 5,870,912 | 2/1999 | Vito ....................................... 70/237 X |

FOREIGN PATENT DOCUMENTS

| | | |
|---|---|---|
| 2419846 | 10/1979 | France . |
| 2579943 | 10/1986 | France . |
| 2681823 | 4/1993 | France . |
| 2719005 | 10/1995 | France . |
| 9215118 | 11/1992 | Germany . |
| 2023520 | 1/1980 | United Kingdom . |
| 2091656 | 8/1982 | United Kingdom . |

*Primary Examiner*—Lloyd A. Gall

[57] ABSTRACT

There is disclosed a vehicle anti-theft device for blocking at least a pedal arm for a brake or clutch of a vehicle. The device includes a first member having a lower movable plate and a shaft extending therefrom. A second member is provided with an upper stationary plate that includes a second hollow shaft. The first shaft slides in the second hollow shaft, whereby the upper and lower movable plates are adapted to receive at least one pedal arm of a vehicle therebetween. A key lock cooperates with the locking member for locking and unlocking the first shaft with respect to the second hollow shaft. The device includes a base plate for bearing upon the floor of a vehicle. In use the first shaft is pulled upwards for moving the lower plate towards the upper plate for enclosing and blocking the pedal arm therebetween. When the first shaft is pushed downwards with respect to the second hollow shaft, the upper and lower plates are separated to free the pedal arm.

29 Claims, 8 Drawing Sheets

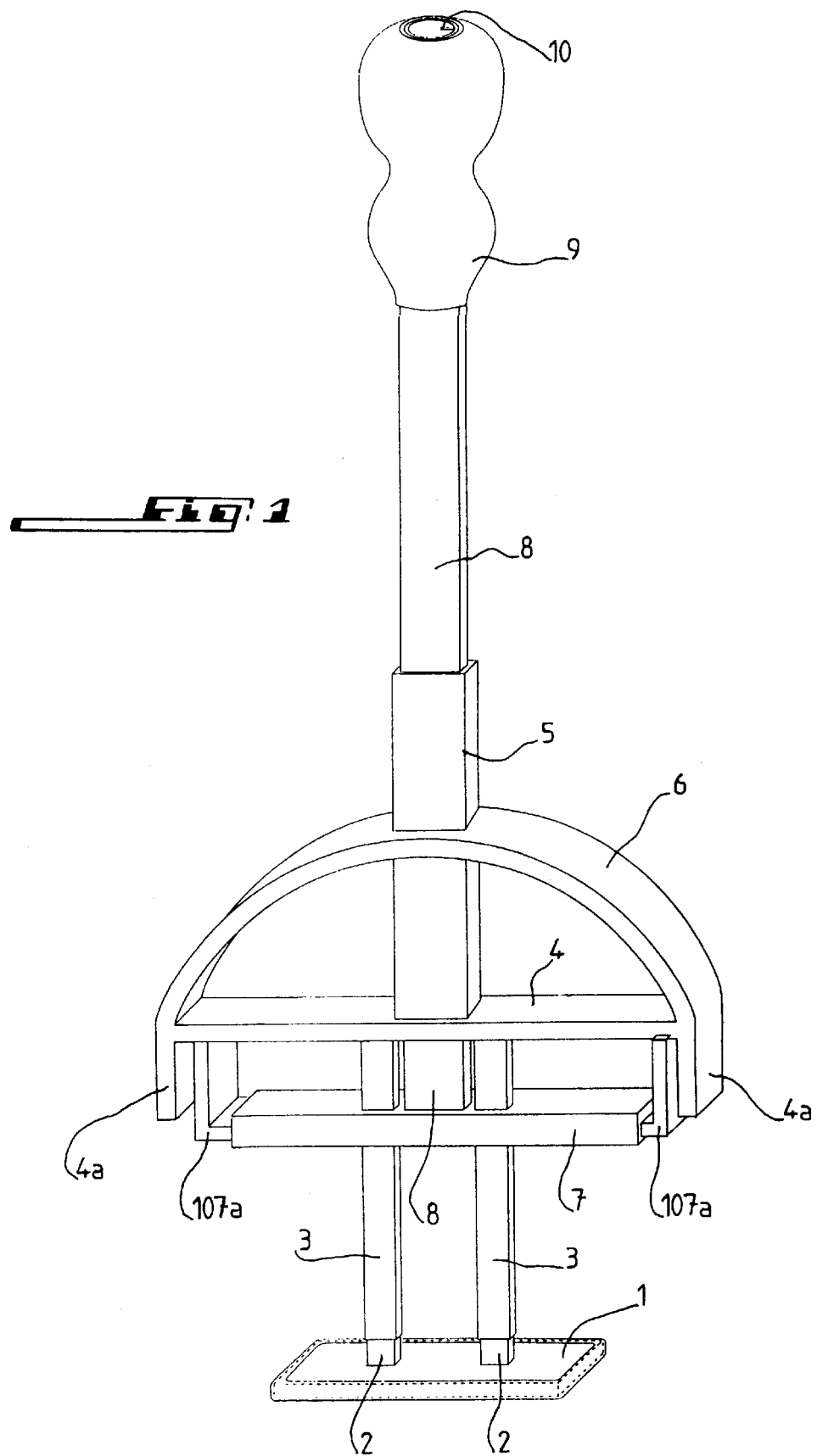

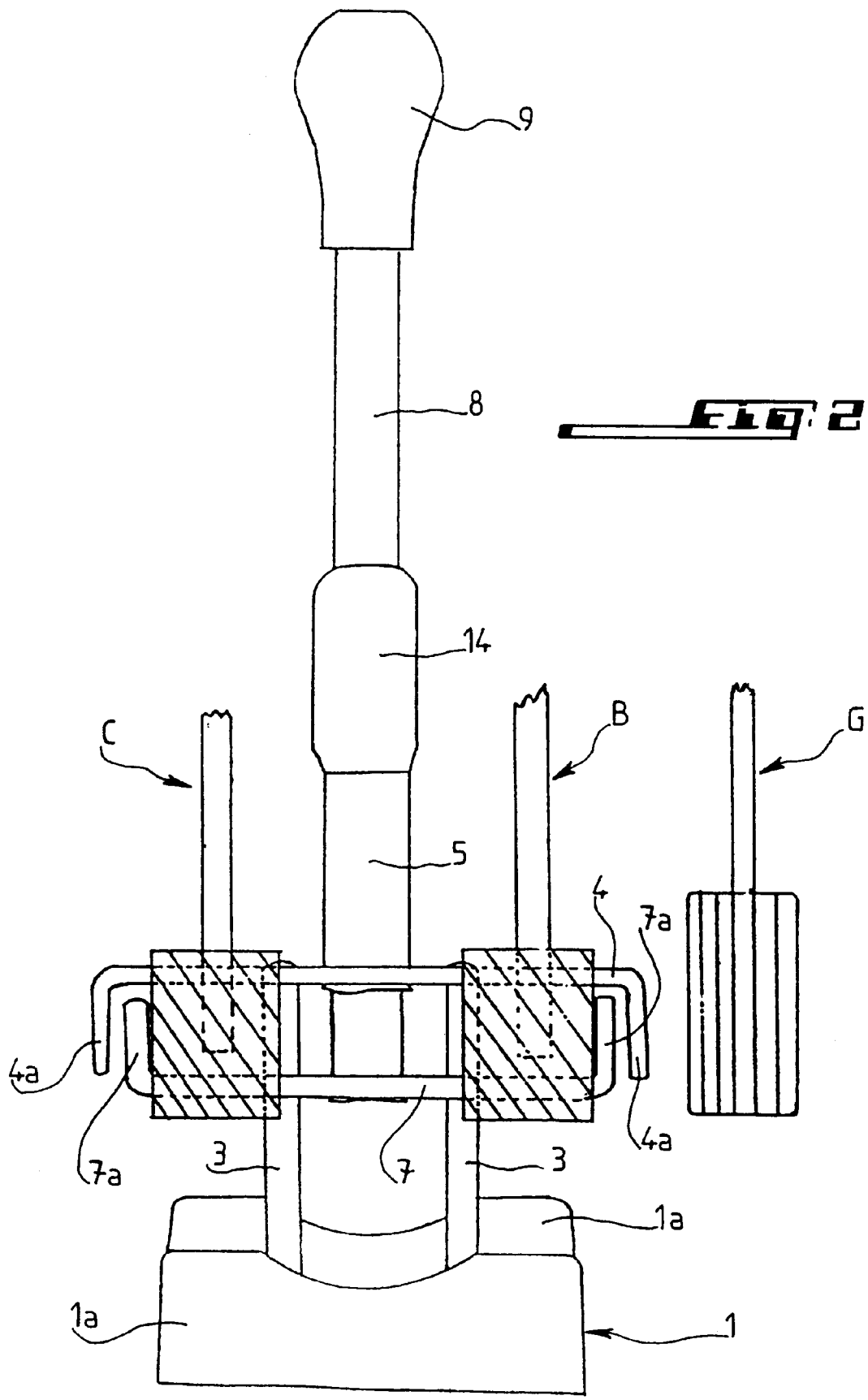

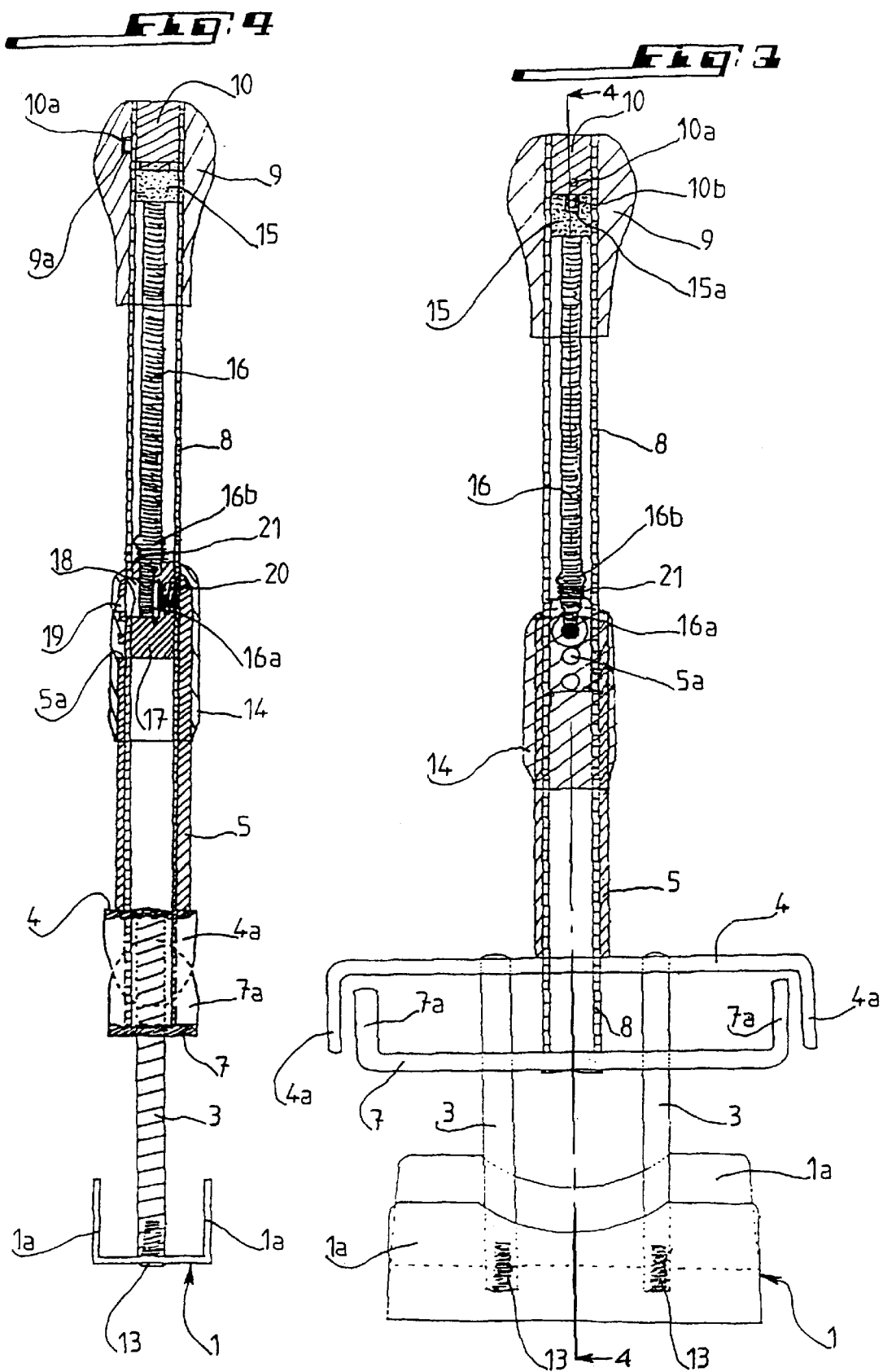

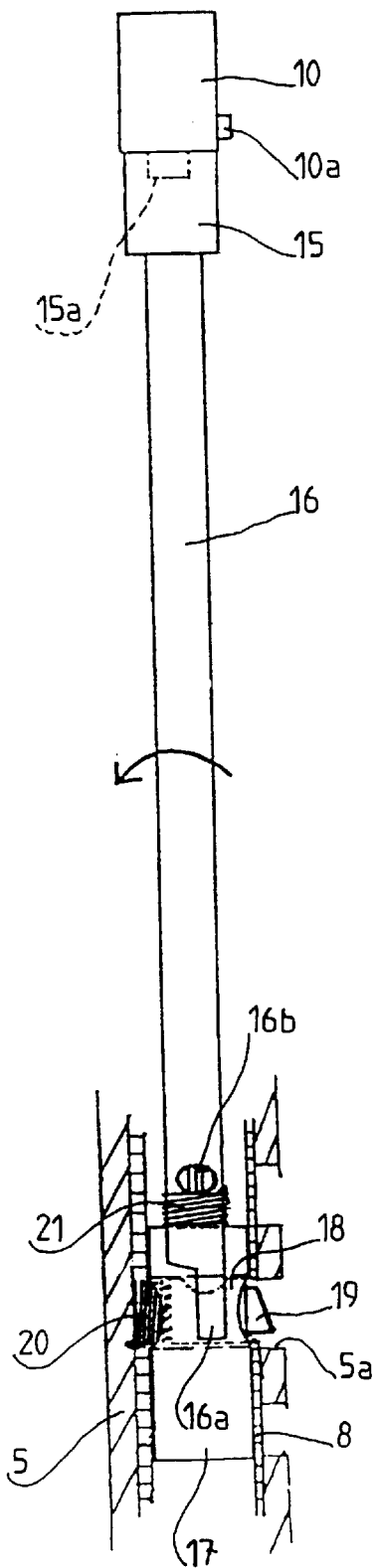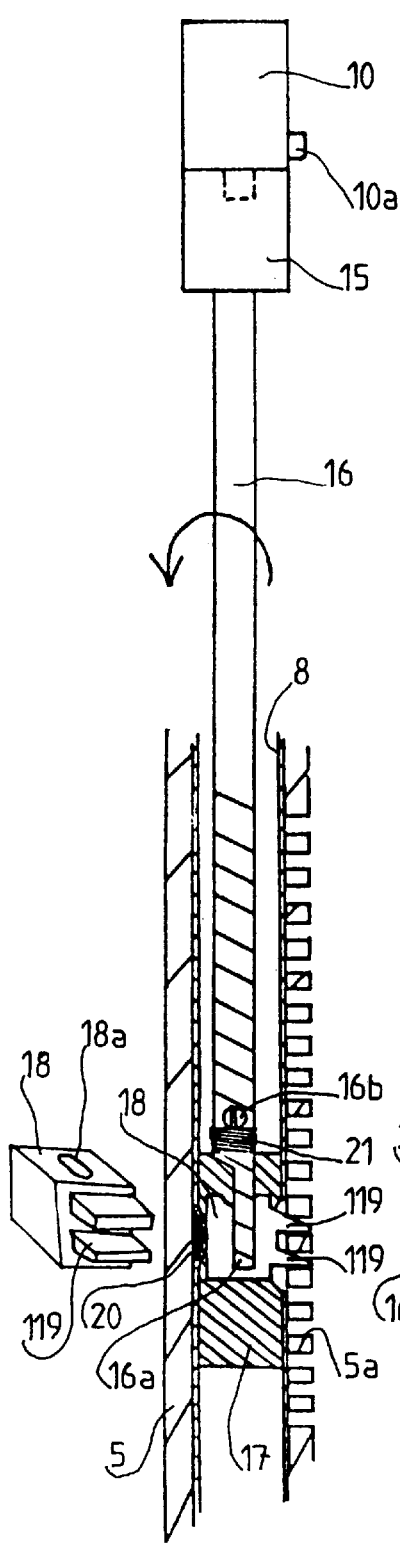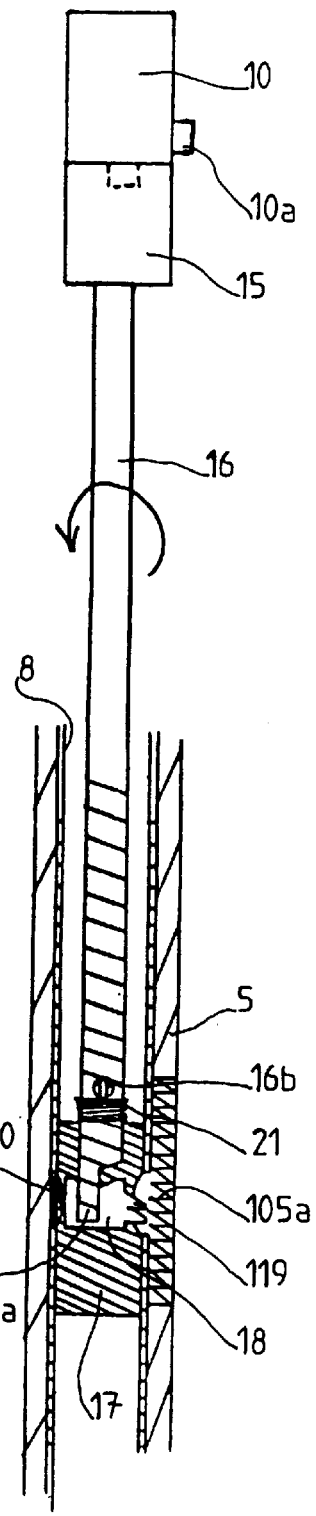

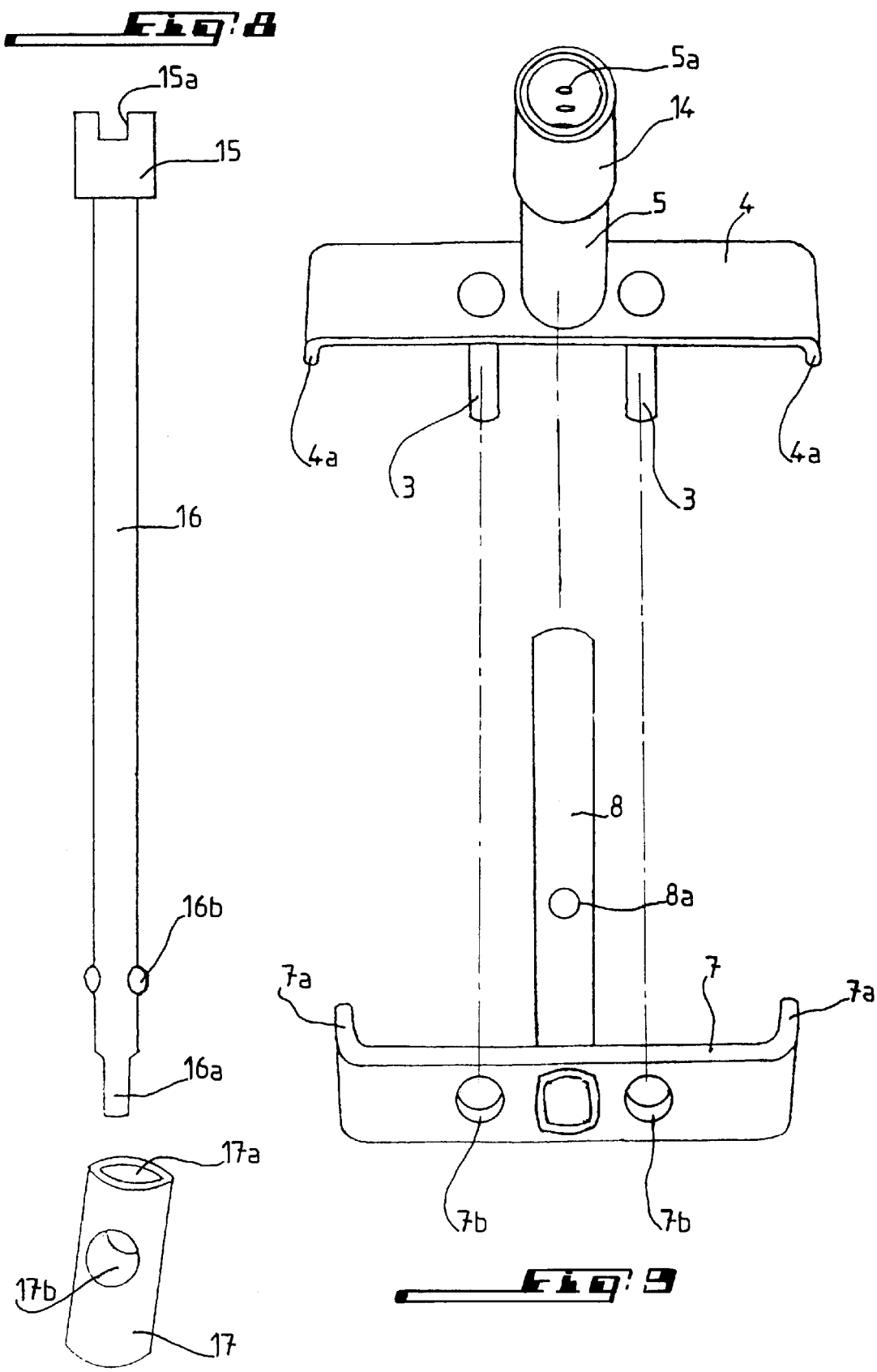

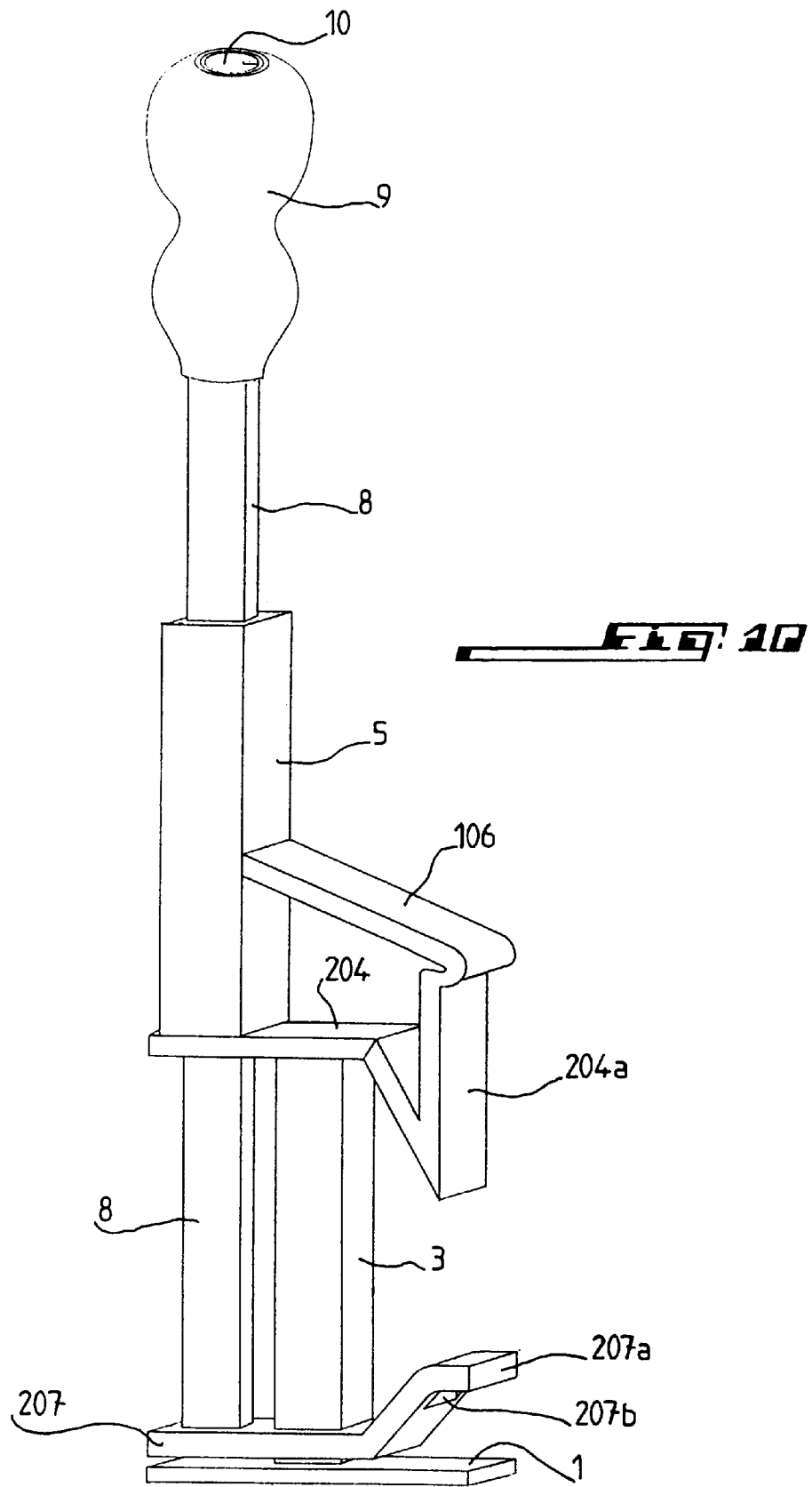

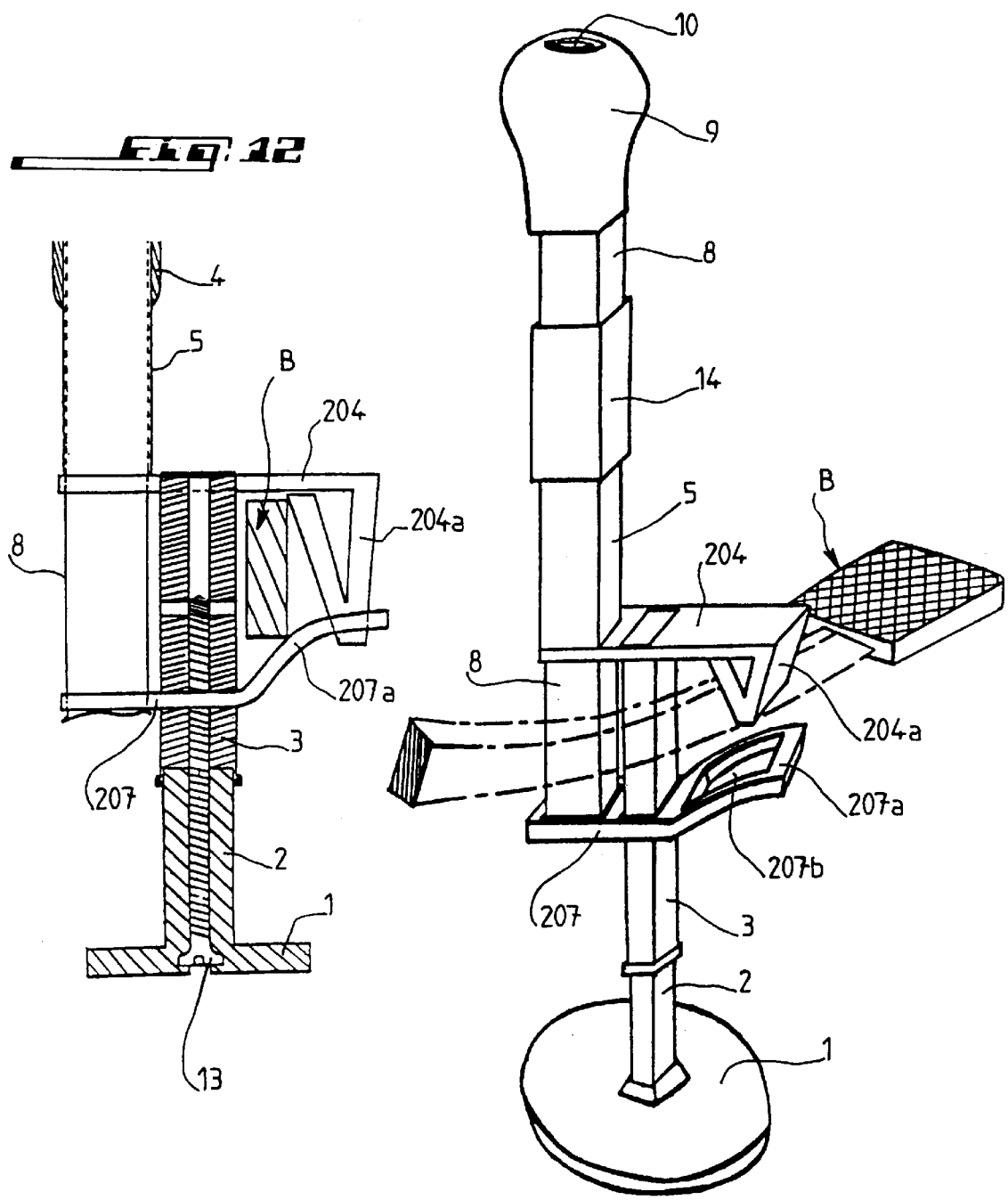

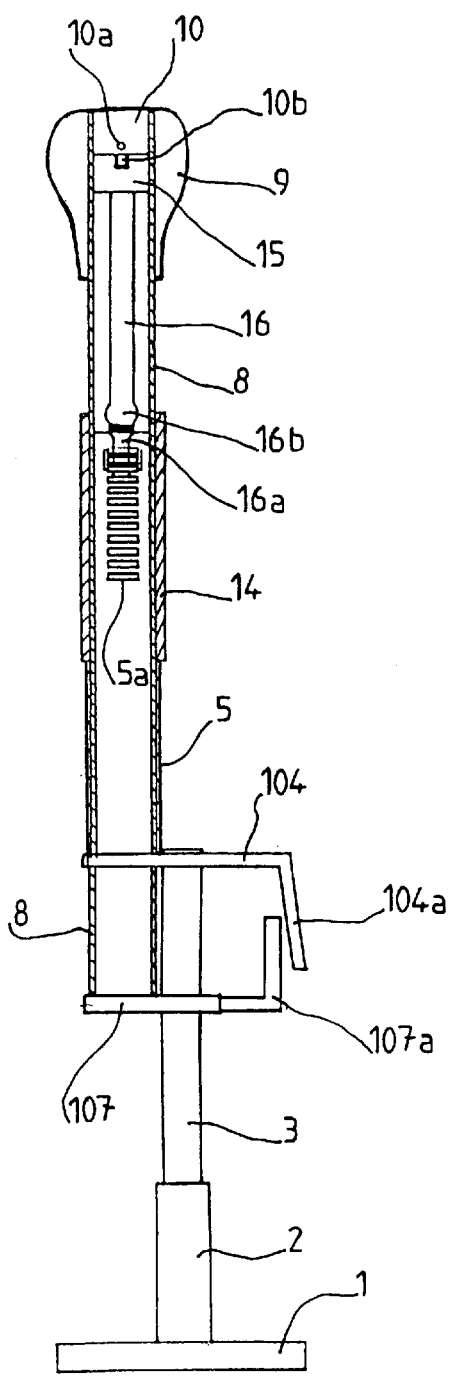
Fig. 13
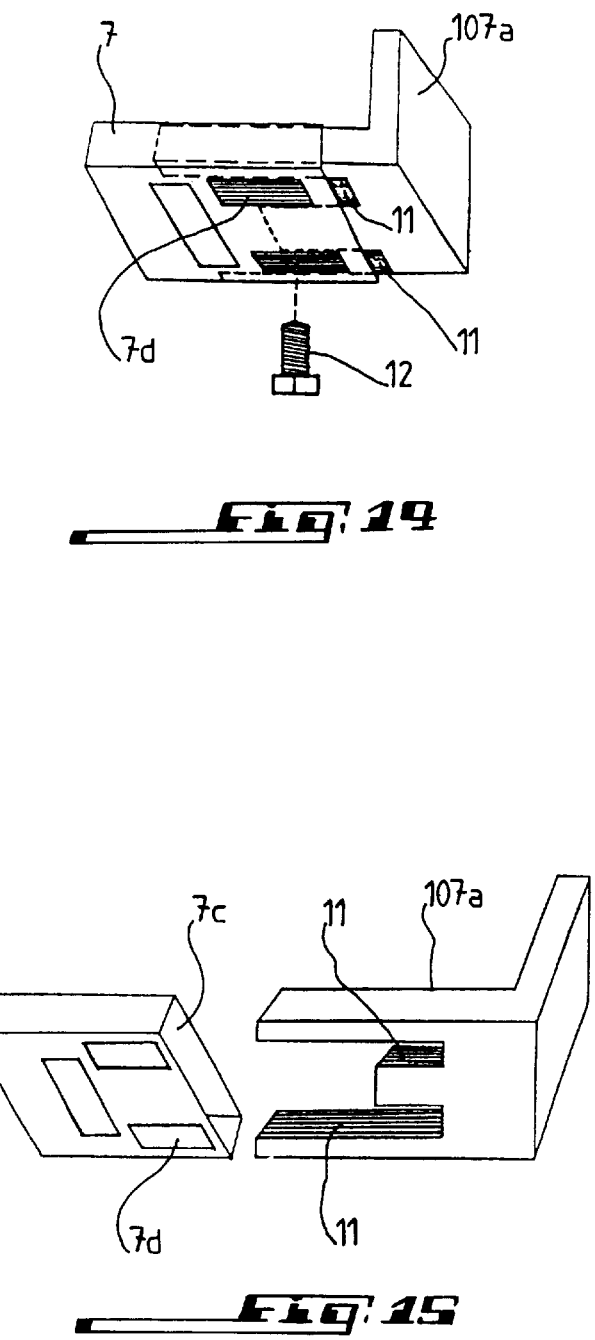
Fig. 14
Fig. 15

VEHICLE ANTI-THEFT DEVICE FOR BLOCKING AT LEAST A PEDAL ARM

BACKGROUND OF THE INVENTION

This application is a Continuation-In-Part of the International Application N° PCT/FR95/01,402 designating the United States and filed on Oct. 24, 1995, the benefit of the international filing date thereof is claimed.

This invention relates in general to a vehicle anti-theft device for blocking at least a pedal arm, for instance a brake pedal only in case of an automatic clutch vehicle and both clutch and brake pedals in case of a manual clutch vehicle.

Document GB-A-2,023,520 in the name of Stoodley discloses an anti-theft locking arrangement for motor vehicles. This arrangement comprises

- a socket member provided with a lower bracket which is permanently secured to the floor of the vehicle by several bolts,
- a removable shaft member telescopically fitting into said socket member and provided with an upper cross-bar so that, in use, the cross-bar is pushed home downwardly against the clutch and brake pedals arms which are depressed towards the floor of the vehicle until the pedal arms abut against the lower bracket,
- a key lock provided at the upper free end of the shaft member co-operating with a locking member for locking and unlocking the shaft member with respect to the socket member,
- said locking member being engageable into a series of blind holes provided into the socket member for blocking the upper cross-bar into its lowermost position.

However, this arrangement has several drawbacks since only the upper part thereof is removable and the lower part is permanently secured to the floor. Indeed, this lower part could provide discomfort to the driver and may even lead to an accident since the socket member stands still between the brake and clutch pedals. When an urgent braking of the vehicle is desired, the driver may try to depress the socket member instead of the adjacent brake pedal.

On the other hand, such an arrangement cannot be easily and quickly carried away by the driver for use into another vehicle, since the lower part is permanently secured to the floor of the vehicle. Moreover, the floor of the vehicle is damaged by the installation of the lower part in this arrangement.

Moreover, in the locked position of the anti-theft arrangement of Stoodley, the pedals are not kept in their dead or rest position but maintained in a constantly depressed state, which does not correspond to the normal use of the pedals and thereby may cause damage to their control system. For instance, in some vehicles, when the brake pedal is depressed, the rear lights are switched on, which would cause the discharging of the battery. In vehicles provided with a fluid control clutch system, when the clutch pedal is depressed, the fluid system is constantly maintained under pressure, which may damage the fluid circuit and generate leakages.

SUMMARY OF THE INVENTION

The primary object of the invention is to provide a novel vehicle anti-theft device which overcomes the above-mentioned drawbacks and which maintains each pedal arm in its dead position when the device is in the locked position.

Another object of the invention is to provide a novel vehicle anti-theft device which is completely removable so that it does not provide discomfort for the driver and does not alter the driving of the vehicle in which it is used.

A third object of the invention is to provide a novel vehicle anti-theft device which is adapted for an automatic clutch vehicle and/or a manual clutch vehicle.

To achieve the objects stated above, the vehicle anti-theft device embodied by the invention features the provision of the following:

- a first member comprising a lower movable plate provided with a first shaft extending upwardly,
- a second member comprising an upper stationary plate provided with a second hollow shaft wherein the first shaft slides longitudinally, said lower and upper plates being adapted to receive at least one pedal arm therebetween,
- a key lock mounted onto the upper free end of the first shaft and co-operating, through a control rod housed into said first shaft, with a locking member for locking and unlocking the first shaft with respect to the second shaft, said locking member being housed in said first shaft and engageable with a vertical series of holes provided in said second shaft, and
- a base plate intended to bear upon the vehicle floor and connected to the upper plate while being spaced away therefrom by a distance adapted to the height separating the pedal to be blocked into its dead position from the floor, said first shaft being pulled upwards for moving the lower plate towards the upper plate for enclosing and blocking the pedal arm therebetween, said first shaft being pushed downwards to open said plates and to free said pedal arm.

In the invention, the lower plate is pulled upwards so that each pedal arm is blocked in its dead or inactive position when the device is locked.

According to one inventive feature, said key lock is adapted to rotate said control rod, the lower end of which comprises a means for pushing the movable locking member out from said holes so that the second shaft is released from the first shaft for unlocking the device.

A return spring may be provided inside said first shaft for urging the locking member into engaging relationship with one of said holes, said means at the lower end of the control rod being alternatively actuated for pushing said movable locking member against the urging force of said spring and for releasing said locking member so that the latter engages one of said holes under the action of said spring.

Particularly, said locking member may comprise at least one locking pin, the lower face of which is at a right angle with respect to the second shaft for preventing said pin from coming out from said holes when a downward force is applied to the first shaft, and the upper face of which is sloped for enabling said pin to come out from said holes and then to slide along the inner wall of said second shaft up to the following hole when said first shaft is pulled upwards.

The provision of such a pin structure enables the user first to lock the device and then to pull the first shaft upwardly until each pedal arm is enclosed between the two plates. Since the engagement of the locking member into the corresponding holes is an automatic operation, these inventive features enable the blocking of the pedal arm without groping.

According to another inventive feature, said base plate is connected to the upper plate by a telescoping rod arrangement for adjusting the height therebetween according to interspace between the floor and the pedal. Said rod arrangement may extend in adjacent and parallel relationship to the first shaft and passes through said lower plate.

According to still another feature, said means at the lower end of the control rod is an eccentric portion which engages an elongated aperture into said locking member.

Each free end of both lower and upper plates may be bent towards the other plate so as to fit into each other and enclose the pedal arm.

In a particular embodiment, the innermost bent portion of the two plates is laterally movable and adjustable on the remaining portion of the same plate for adapting the accommodation space between the two plates to the pedal arm to be blocked.

According to a first embodiment, both plates only extend on one side of the respective shafts in overlying relationship.

According to another embodiment, both plates extend on two opposite sides of the respective shafts in overlying relationship for blocking a pedal arm on both sides of the device.

A reinforcement bar may connect the second shaft to the upper plate.

Another return spring may be axially fitted onto the lower end of the control rod in abutting relationship between small projections onto said rod and a cylinder secured into said first shaft, said cylinder housing said movable locking member.

According to another aspect of this invention, the vehicle anti-theft blocking device comprises:

- a first member comprising a lower movable plate provided with a first shaft extending upwardly,
- a second member comprising an upper stationary plate provided with a second hollow shaft wherein the first shaft slides longitudinally, said lower and upper plates being adapted to receive a brake pedal arm therebetween,
- a key lock mounted onto the upper free end of the first shaft and co-operating, through a control rod housed into said first shaft, with a locking member for locking and unlocking the first shaft with respect to the second shaft, said locking member being housed in said first shaft and engageable with a vertical series of holes provided in said second shaft, and
- a base plate intended to bear upon the vehicle floor and connected to the upper plate while being spaced away therefrom by a distance adapted to the height separating the pedal to be blocked into its dead position from the floor,
- said first shaft being pulled upwards for moving the lower plate towards the upper plate for enclosing and blocking the pedal arm therebetween, said first shaft being pushed downwards to open said plates and to free said pedal arm.

According to still another aspect of the invention, the vehicle anti-theft blocking device comprises:

- a first member comprising a lower movable plate provided with a first shaft extending upwardly,
- a second member comprising an upper stationary plate provided with a second hollow shaft wherein the first shaft slides longitudinally, said lower and upper plates being adapted to receive a clutch pedal arm and a brake pedal arm therebetween,
- a key lock mounted onto the upper free end of the first shaft and co-operating, through a control rod housed into said first shaft, with a locking member for locking and unlocking the first shaft with respect to the second shaft, said locking member being housed in said first shaft and engageable with a vertical series of holes provided in said second shaft, and
- a base plate intended to bear upon the vehicle floor and connected to the upper plate while being spaced away therefrom by a distance adapted to the height separating the pedal arms to be blocked into its dead position from the floor,
- said first shaft being pulled upwards for moving the lower plate towards the upper plate for enclosing and blocking the pedal arms therebetween, said first shaft being pushed downwards to open said plates and to free said pedal arms.

This invention will be better understood and other objects, details, advantages and characteristic features thereof will be clarified more fully using the explanatory detailed following description of the particular embodiments presently preferred of the invention given for a merely illustrative and non limitative purpose only, with reference to the accompanying drawings.

BRIEF DESCRIPTION OF THE DRAWINGS

FIG. 1 is a front elevation and perspective view showing a first embodiment of the anti-theft device according tore invention, for a manual clutch vehicle;

FIG. 2 is a front elevation view of another embodiment according to the invention, wherein the device blocks a brake pedal and a clutch pedal;

FIG. 3 is a front elevation and partially sectional view of the embodiment of FIG. 2;

FIG. 4 is a sectional view following line 4—4 of FIG. 3;

FIG. 5 is an enlarged sectional view of the locking arrangement according to the invention;

FIGS. 6 sand 7 are views similar to FIG. 5, but showing two other locking arrangements according to the invention;

FIG. 8 is an elevation view showing the control rod of the locking arrangement according to the invention;

FIG. 9 is a partially exploded and perspective view of the first and second members of the inventive device;

FIG. 10 is a front elevation perspective view of another embodiment according to the invention, wherein the device is adapted for an automatic clutch vehicle;

FIG. 11 is a view almost similar to FIG. 10, showing an alternative embodiment of the device in its locked position;

FIG. 12 is a sectional and partial view of FIG. 11;

FIG. 13 is an elevation partially sectional view of another alternative embodiment for an automatic clutch vehicle;

FIG. 14 is an enlarged perspective view of the lower plate shown FIG. 13; and

FIG. 15 is an exploded view of FIG. 14.

DETAILED DESCRIPTION OF THE PREFERRED EMBODIMENTS

Referring now to the drawings, a first embodiment of the anti-theft device according to the invention is shown in FIG. 1. This device comprises a base plate 1 provided with two rods 2 in a vertically parallel and spaced apart relationship. These rods 2 are telescopically fitted into two corresponding tubes 3 which are connected to the lower face of an upper plate 4. This upper plate 4 is provided with a hollow shaft 5 extending from the upper face of the upper plate 4 upwardly. This hollow shaft 5 is vertically located inbetween the two opposite tubes 3. An arch-shaped reinforcement cross-bar 6 extends above upper plate 4 and connects the hollow shaft 5 to both free ends 4a of the upper plate 4. The two end portions 4a of the upper plate 4 are bent downwardly. The hollow shaft 5 and both tubes 3 are substantially located at the center of the upper plate 4, so that the construction thereof is symmetrical with respect to the central axis of the device.

The anti-theft device also comprises a lower plate 7 centrally secured with another shaft 8 which extends upwardly and is introduced through the hollow shaft 5 for a sliding movement, so that the lower plate 7 vertically lies under the upper plate 4. The shaft 8 extends from both ends of the hollow shaft 5. The end portions 107a of the lower plate 7 are bent upwardly and enclosed by the end portions 4a of the upper plate 4 in the locked position of the device, as shown in FIG. 1. On both sides of shaft 8 two holes 7b are drilled through lower plate 7 for a sliding engagement with tubes 3. The upper end of shaft 8 is provided with a handle 9 for pushing or pulling the shaft 8. At the top of the handle 9 and of the shaft 8 is housed a key lock 10.

In this embodiment, the bent end portions 107a of the lower plate 7 are each a separate piece from the lower plate 7 for enabling a lateral adjustment of the length of the lower plate 7 inside the space defined by the bent end portions 4a of the upper plate 4. Each end portion 107a fits into a recess 7c provided at the free end of the lower plate 7 as shown in FIGS. 14 and 15. The engaging portion of the bent piece 107a is grooved at 11 for a threaded attachment to the lower plate 7 by means of bolts or screws 12 passing through corresponding apertures 7d provided on the lower face of the lower plate 7. This lateral adjustment of the length of the lower plate 7 enables the user to adapt the receiving space between two plates 4 and 7 to the size and position of a pedal arm to be blocked therebetween.

Turning now to FIG. 2, an alternative embodiment of the inventive device is shown. This alternative embodiment essentially differs from the previous embodiment by the following features: the end portions 7a of the lower plate 7 are integral therewith; the reinforcement cross-bar 6 is cancelled; the base plate 1 is bent at right angle on its two opposite longitudinal edges 1a for partially covering the rods 2 and the tubes 3.

FIG. 2 shows the pedal arms arrangement for a manual clutch vehicle comprising a clutch pedal C, a brake pedal B and a gas pedal G. As shown, the clutch pedal and the brake pedal are each blocked between plates 4 and 7 on both sides of shafts 5 and 8 respectively, whereas the gas pedal G is let free. This device is so designed that it does not interfere with the gas pedal G. As indicated above, the pedal arms only are blocked by the inventive device, but not the pedal pads.

As better shown in FIGS. 3 and 4, the base plate 1 is releasably attached to the tubes 3 by a screw 13 the access of which is prevented in use, since the lower face of the base plate 1 bears against the floor of the vehicle. As shown in FIG. 12, such a screw 13 may be used for adjusting the telescoping engagement of a rod 2 into a corresponding tube 3.

As shown in FIG. 2, a bushing 14 is fitted onto the upper portion of the shaft 5 for covering a series of vertical holes 5a drilled through the shaft 5 (see FIGS. 3 and 4).

However as shown in FIG. 7, when said holes 5a are blind and only opened towards the inner face of the hollow shaft 5, such a bushing is not required, as in the case of the embodiment shown in FIG. 1.

Referring now to FIGS. 3 to 8, the arrangement of the locking device is to be described.

The key lock 10 is provided with a latch bolt 10a which is engageable into a corresponding keeper hole 9a provided through the shaft 8 and partially into the handle 9, when driven by the suitable key (not shown). The rotating plug of the key lock 10 is provided on its lower face with a rail or rib 10b which fits into a corresponding groove 15a provided on the upper face of a joint 15 housed into the hollow shaft 8. This cylindrical joint 15 is secured to a control rod 16 which extends inside the hollow shaft 8 axially and downwardly. The lower end 16a of the control rod 16 is free and provided with an eccentric portion of reduced diameter. Moreover, this control rod 16 is provided with small projections 16b in the vicinity of its lower end 16a.

On the other hand, a sleeve 17 is secured to the inside of the hollow shaft 8, for instance by welding, and is provided with an upper opening 17a for an interengaging relationship with the eccentric portion 16a of the control rod 16.

A through hole 17b is provided into the sleeve 17 radially so that the upper opening 17a opens into said through hole. This through hole 17b is adapted to house a movable locking member 18 with a sliding relationship. The eccentric portion 16a of the control rod 16 is introduced into an elongated slot 18a on the upper face of the locking member 18 as explained more in detail hereafter. This locking member 18 comprises one locking pin 19 as shown in FIG. 5 or two locking pins 119 as shown in FIGS. 6 and 7 for engaging the vertical series of holes 5a or 105a of the hollow shaft 5. When the locking member 18 comprises two or more locking pins 119, the holes 5a into the shaft 5 are spaced apart a shorter distance.

Additionally, a return spring 20 is housed into the through hole 17b of sleeve 17 and bears against the face of the locking member 18 opposite to the locking pin 19 in order to urge the locking member into its locking engagement with the holes 5a or 105a. The slot 18a mentioned above is so shaped that the eccentric portion 16a may only push back the locking member 18 against the urging force of the return spring 20 for unlocking the device. In other words, when the device is in its locked state, it is not the eccentric portion 16a which urges the locking member into engagement with a hole 5a, but only the return spring 20. The purpose for this specific arrangement will be explained hereafter.

Another return spring 21 is provided between the small projections 16b of the control rod 16 and the upper face of the sleeve 17 for urging the control rod 16 upwards and maintaining same into engagement with the key lock 10.

Besides, as better shown in FIG. 9, the shaft member 8 comprises a through hole 8a at a location corresponding to the through hole 17b of the sleeve 17 for enabling the locking member 18 to engage the locking holes 5a of the hollow shaft 5.

As one may clearly see, the locking pin 19 has a lower face at a right angle with respect to the shaft 5, so that the shaft 8 may not be further pushed down when said locking pin 19 is introduced into a hole 5a. The upper face of the locking pin 19 is bevelled or inclined so that by pulling the shaft 8 upwardly, the locking pin 19 may slide back against spring 20, with no interference with eccentric portion 16a, and come out of the corresponding hole 5a, and then slide along the inner face of hollow shaft 5 until it enters into the overlying hole 5a. This feature enables the user to first close the key lock 10, and then gradually pull the shaft 8 upwardly until the pedal arms are blocked and enclosed between the two plates 4 and 7. In other words, the locking operation of the device is disconnected from the blocking operation of the pedal arms. In the prior art, these two operations must be carried out simultaneously.

Of course, this particular arrangement of the locking system is not limitative and may be replaced by another system as long as it allows the lower plate to be pulled upwardly for blocking the pedal arms.

Turning now to FIGS. 10 to 13, another embodiment of the inventive device is shown for an automatic clutch vehicle.

The embodiment shown in FIG. 10 essentially differs from the embodiment of FIG. 1 by the following features: the base plate 1 is provided with one rod only which telescopically fits into a single tube 3 which is secured to an upper plate 204 which extends on one side of the hollow shaft 5 only; a reinforcement bar 106 connects the shaft member 5 to the single end portion 204a of the upper plate 204; similarly, the lower plate 207 extends on one side of the shaft member 8 only and only comprises one through hole for a sliding engagement with tube 3; both end portions 204a and 207a of upper plate 204 and lower plate 207 respectively are not at right angle but sloped towards the outside; finally the bent end portion 207a of the lower plate 207 is slotted for housing the bent end portion 204a of the upper plate 204 when both plates are in the blocking position.

The shaft member 5 of the embodiment in FIG. 10 does not comprise a sleeve 14 as the embodiment of FIG. 1 since the holes 105a are blind.

Turning now to FIGS. 11 and 12, an alternative embodiment is shown with no reinforcement bar, but with a sleeve 14 for covering the holes 5a. Here, the base plate 1 is not rectangularly shaped but circular.

FIG. 13 shows another alternative embodiment for an automatic clutch vehicle, wherein the tube 3 is telescopically fitted into a rod 2. In this embodiment, the end portion 107a of the lower plate 107 is not inclined but at right angle and consists of a separate piece as in FIG. 1. The bent end portion 104a of the upper plate 104 is slightly inclined with respect to the end portion 107a of the lower plate 107, but is not bent backwards again as in FIGS. 10 to 12.

Although the embodiments shown in FIGS. 10 to 13 are directed to an automatic clutch vehicle, the receiving space between both plates may be adapted for receiving and blocking both the brake pedal arm and the clutch pedal arm of a manual clutch vehicle.

The operation of the inventive device will be now briefly explained with reference to the drawings.

When the device is in its unlocked state, the shaft member 8 may freely slide into the hollow shaft member 5, so that the lower plate is in its lowermost position and bears against the base plate. Such a position enables the user to mount the device onto the pedal arms of the vehicle with the base plate bearing against the floor and the upper plate standing above these pedal arms.

Then, the user may turn the key lock to its locking position which turns the control rod, so that the locking member is released and the return spring urges same into engagement with the holes of the shaft member 5.

Thereafter, the user may pull the shaft member 8 upwardly by holding the handle 9 for instance, so that the locking member gradually and successively engages the overlying holes 5a until the lower plate comes closer to the upper plate or abuts against the pedal arms. The lower plate is prevented from any downward movement by the right angled lower face of the locking pin.

Of course, alternatively, the user may close the key lock 10 after having pulled the shaft member 8 upwards.

When the user wishes to remove the device for driving the vehicle for instance, he turns in the opposite direction the key lock 10 which drives the control rod in the opposite direction, so that the eccentric portion 16a thereof pushes back the locking member against the return spring 20. The locking member 18 being disengaged from the holes 5a, the shaft member 8 may freely slide into the shaft member 5. Therefore, the user may easily remove the device from the pedal arms.

Of course, the operation of the device shown in FIGS. 10 to 13 is identical.

Before mounting the device onto the pedal arms, the user may adjust the distance between the upper plate 4 and the base plate 1 by screwing or unscrewing the screw 13 so that the upper plate 4 does not urge or push the pedal arms downwards.

In accordance with the provisions of the patent statutes, the principle and mode of operation of the present invention have been explained and illustrated in its preferred embodiments. However, it must be understood that the present invention may be practiced otherwise than as specifically explained and illustrated without departing from its spirit or scope.

What is claimed is:

1. A vehicle anti-theft blocking device comprising:
    a first member comprising a lower movable plate provided with a first shaft extending upwardly,
    a second member comprising an upper stationary plate provided with a second hollow shaft wherein the first shaft slides longitudinally, said lower and upper plates being adapted to receive at least one pedal arm therebetween,
    a key lock mounted onto the upper free end of the first shaft and co-operating, through a control rod housed into said first shaft, with a locking member for locking and unlocking the first shaft with respect to the second shaft, said locking member being housed in said first shaft and engageable with a vertical series of holes provided in said second shaft, and
    a base plate intended to bear upon the vehicle floor and connected to the upper plate while being spaced away therefrom by a distance adapted to the height separating the pedal to be blocked into its dead position from the floor,
    said first shaft being pulled upwards for moving the lower plate towards the upper plate for enclosing and blocking the pedal arm therebetween, said first shaft being pushed downwards to open said plates and to free said pedal arm.

2. A vehicle anti-theft device according to claim 1, wherein said key lock is adapted to rotate said control rod, the lower end of which comprises a means for pushing the movable locking member out from said holes so that the second shaft is released from the first shaft for unlocking the device.

3. A vehicle anti-theft device according to claim 2, wherein a return spring is provided inside said first shaft for urging the locking member into engaging relationship with one of said holes, said means at the lower end of the control rod being alternatively actuated for pushing said movable locking member against the urging force of said spring and for releasing said locking member so that the latter engages one of said holes under the action of said spring.

4. A vehicle anti-theft device according to claim 3, wherein said locking member comprises at least one locking pin, the lower face of which is at right angle with respect to the second shaft for preventing said pin from coming out from said holes when a downward force is applied to the first shaft, and the upper face of which is sloped for enabling said pin to come out from said holes and then to slide along the inner wall of said second shaft up to the following hole when said first shaft is pulled upwards.

5. A vehicle anti-theft device according to claim 1, wherein said base plate is connected to the upper plate by a telescoping rod arrangement for adjusting the height therebetween according to interspace between the floor and the pedal.

6. A vehicle anti-theft device according to claim 5, wherein said rod arrangement extends in adjacent and parallel relationship to the first shaft and passes through said lower plate.

7. A vehicle anti-theft device according to claim 2, wherein said means at the lower end of the control rod is an eccentric portion which engages an elongated aperture into said locking member.

8. A vehicle anti-theft device according to claim 1, wherein each free end of both lower and upper plates is bent towards the other plate so as to fit into each other and enclose the pedal arm.

9. A vehicle anti-theft device according to claim 8, wherein the innermost bent portion of the two plates is laterally movable and adjustable on the remaining portion of the same plate for adapting the accommodation space between the two plates to the pedal arm to be blocked.

10. A vehicle anti-theft device according to claim 1, wherein both plates only extend on one side of the respective shafts in overlying relationship.

11. A vehicle anti-theft device according to claim 1, wherein both plates extend on two opposite sides of the respective shafts in overlying relationship for blocking a pedal arm on both sides of the device.

12. A vehicle anti-theft device according to claim 1, wherein a reinforcement bar connects the second shaft to the upper plate.

13. A vehicle anti-theft device according to claim 1, wherein a return spring is axially fitted onto the lower end of the control rod in abutting relationship between small projections onto said rod and a cylinder secured into said first shaft, said cylinder housing said movable locking member.

14. A vehicle anti-theft blocking device comprising:
  a first member comprising a lower movable plate provided with a first shaft extending upwardly,
  a second member comprising an upper stationary plate provided with a second hollow shaft wherein the first shaft slides longitudinally, said lower and upper plates being adapted to receive a brake pedal arm therebetween,
  a key lock mounted onto the upper free end of the first shaft and co-operating, through a control rod housed into said first shaft, with a locking member for locking and unlocking the first shaft with respect to the second shaft, said locking member being housed in said first shaft and engageable with a vertical series of holes provided in said second shaft, and
  a base plate intended to bear upon the vehicle floor and connected to the upper plate while being spaced away therefrom by a distance adapted to the height separating the pedal to be blocked into its dead position from the floor,
  said first shaft being pulled upwards for moving the lower plate towards the upper plate for enclosing and blocking the pedal arm therebetween, said first shaft being pushed downwards to open said plates and to free said pedal arm.

15. A vehicle anti-theft device according to claim 14, wherein said key lock is adapted to rotate said control rod, the lower end of which comprises a means for pushing the movable locking member out from said holes so that the second shaft is released from the first shaft for unlocking the device.

16. A vehicle anti-theft device according to claim 15, wherein a return spring is provided inside said first shaft for urging the locking member into engaging relationship with one of said holes, said means at the lower end of the control rod being alternatively actuated for pushing said movable locking member against the urging force of said spring and for releasing said locking member so that the latter engages one of said holes under the action of said spring.

17. A vehicle anti-theft device according to claim 16, wherein said locking member comprises at least one locking pin, the lower face of which is at right angle with respect to the second shaft for preventing said pin from coming out from said holes when a downward force is applied to the first shaft, and the upper face of which is sloped for enabling said pin to come out from said holes and then to slide along the inner wall of said second shaft up to the following hole when said first shaft is pulled upwards.

18. A vehicle anti-theft device according to claim 14, wherein said base plate is connected to the upper plate by a telescoping rod arrangement for adjusting the height therebetween according to interspace between the floor and the pedal, said rod arrangement extends in adjacent and parallel relationship to the first shaft and passes through said lower plate.

19. A vehicle anti-theft device according to claim 14, wherein both plates only extend on one side of the respective shafts in overlying relationship.

20. A vehicle anti-theft device according to claim 19, wherein the free end of both lower and upper plates is bent towards the other plate so as to fit into each other and enclose the pedal arm.

21. A vehicle anti-theft device according to claim 20, wherein the innermost bent portion of the two plates is laterally movable and adjustable on the remaining portion of the same plate for adapting the accommodation space between the two plates to the pedal arm to be blocked.

22. A vehicle anti-theft blocking device comprising:
  a first member comprising a lower movable plate provided with a first shaft extending upwardly,
  a second member comprising an upper stationary plate provided with a second hollow shaft wherein the first shaft slides longitudinally, said lower and upper plates being adapted to receive a clutch pedal arm and a brake pedal arm therebetween,
  a key lock mounted onto the upper free end of the first shaft and co-operating, through a control rod housed into said first shaft, with a locking member for locking and unlocking the first shaft with respect to the second shaft, said locking member being housed in said first shaft and engageable with a vertical series of holes provided in said second shaft, and
  a base plate intended to bear upon the vehicle floor and connected to the upper plate while being spaced away therefrom by a distance adapted to the height separating the pedal arms to be blocked into its dead position from the floor,
  said first shaft being pulled upwards for moving the lower plate towards the upper plate for enclosing and blocking the pedal arms therebetween, said first shaft being pushed downwards to open said plates and to free said pedal arms.

23. A vehicle anti-theft device according to claim 22, wherein said key lock is adapted to rotate said control rod, the lower end of which comprises a means for pushing the movable locking member out from said holes so that the second shaft is released from the first shaft for unlocking the device.

24. A vehicle anti-theft device according to claim 23, wherein a return spring is provided inside said first shaft for urging the locking member into engaging relationship with one of said holes, said means at the lower end of the control rod being alternatively actuated for pushing said movable locking member against the urging force of said spring and for releasing said locking member so that the latter engages one of said holes under the action of said spring.

25. A vehicle anti-theft device according to claim 24, wherein said locking member comprises at least one locking pin, the lower face of which is at right angle with respect to the second shaft for preventing said pin from coming out from said holes when a downward force is applied to the first shaft, and the upper face of which is sloped for enabling said pin to come out from said holes and then to slide along the inner wall of said second shaft up to the following hole when said first shaft is pulled upwards.

26. A vehicle anti-theft device according to claim 22, wherein said base plate is connected to the upper plate by a telescoping rod arrangement for adjusting the height therebetween according to interspace between the floor and the pedal arms, said rod arrangement extends in adjacent and parallel relationship to the first shaft and passes through said lower plate.

27. A vehicle anti-theft device according to claim 22, wherein both plates extend on two opposite sides of the respective shafts in overlying relationship for blocking a pedal arm on both sides of the device.

28. A vehicle anti-theft device according to claim 27, wherein each free end of both lower and upper plates is bent towards the other plate so as to fit into each other and enclose a pedal arm.

29. A vehicle anti-theft device according to claim 28, wherein the innermost bent portion of the two plates is laterally movable and adjustable on the remaining portion of the same plate for adapting the accommodation space between the two plates to each pedal arm to be blocked.

\* \* \* \* \*